US012043045B2

(12) United States Patent
Collins

(10) Patent No.: US 12,043,045 B2
(45) Date of Patent: Jul. 23, 2024

(54) STITCHING METHODS AND SYSTEMS

(71) Applicant: Global Inkjet Systems Limited, Cambridge (GB)

(72) Inventor: Philip Collins, Cambridge (GB)

(73) Assignee: Global Inkjet Systems Limited, Cambridge (GB)

( * ) Notice: Subject to any disclaimer, the term of this patent is extended or adjusted under 35 U.S.C. 154(b) by 112 days.

(21) Appl. No.: 17/951,766

(22) Filed: Sep. 23, 2022

(65) Prior Publication Data

US 2023/0019470 A1 Jan. 19, 2023

Related U.S. Application Data

(63) Continuation of application No. PCT/EP2021/057781, filed on Mar. 25, 2021.

(30) Foreign Application Priority Data

Mar. 26, 2020 (EP) .................................... 20165857

(51) Int. Cl.
*B41J 3/407* (2006.01)
*B41J 2/21* (2006.01)
(Continued)

(52) U.S. Cl.
CPC ........... *B41J 3/4073* (2013.01); *B41J 2/2132* (2013.01); *B41J 3/543* (2013.01); *B41J 25/316* (2013.01)

(58) Field of Classification Search
CPC ........ B41J 2/2132; B41J 3/4073; B41J 3/543; B41J 19/145; B41J 25/316; B41J 2/04541; B41J 2/04586
See application file for complete search history.

(56) References Cited

U.S. PATENT DOCUMENTS

2016/0009104 A1* 1/2016 Matsuhashi ............ B41J 3/4073 347/9
2020/0215834 A1* 7/2020 Bauer .................... B41J 3/4073
2021/0170763 A1 6/2021 Bustgens

FOREIGN PATENT DOCUMENTS

CN 103 722 886 A 4/2014
DE 10 2018 003096 A1 10/2019
EP 1 990 206 A2 11/2008

OTHER PUBLICATIONS

International Preliminary Report on Patentability and Written Opinion for Application No. PCT/EP2021/057781 dated Mar. 25, 2021.

* cited by examiner

*Primary Examiner* — Jannelle M Lebron
(74) *Attorney, Agent, or Firm* — KDW Firm PLLC

(57) ABSTRACT

A method includes providing a printhead for printing an image on a surface from two different printhead positions relative to the surface, the two different printhead positions at first and second orientations, wherein the at least one printhead and the surface move relative to each other along a print path having two potentially overlapping swathes, determining an overlap area on the surface for the two overlapping swathes wherein the overlap area is to be printed on from either of the two different printhead positions, determining for each position in the overlap area at which an inkjet drop may be printed the angle of incidence at the surface of that drop, and selecting a stitch point or region in the overlap area wherein the difference between the angles of incidence at the surface of drops from the two printhead positions is kept within an acceptable limit.

6 Claims, 4 Drawing Sheets

(51) Int. Cl.

| | |
|---|---|
| ***B41J 3/54*** | (2006.01) |
| ***B41J 25/316*** | (2006.01) |

STITCHING METHODS AND SYSTEMS

CROSS-REFERENCE TO RELATED APPLICATIONS

This application is a continuation of and claims priority to Patent Application No. PCT/EP2021/057781 filed Mar. 25, 2021, which claims priority to European Patent Application No. 20165857.2 filed Mar. 26, 2020, the entire disclosures of which are incorporated by reference herein.

TECHNICAL FIELD

Aspects of the present invention generally relate to inkjet printing systems, and in particular to methods and systems to enable effective image stitching between different swathes of a printed image, when printing on curved surfaces.

BACKGROUND

Modern inkjet printing systems typically include printheads containing multiple droplet ejection devices, also referred to as "nozzles" which form nozzle arrays. Each nozzle typically comprises an actuator that is arranged to eject ink from the nozzle when actuated. Such actuators include piezoelectric actuators for example.

Actuators are driven by drive electronics (electronic drive circuits) which provide a voltage waveform or common drive signal which is configured to result in the ejection of ink from a nozzle. For example, an actuation event creates a pressure pulse in an ink chamber of the nozzle, which in turn dispenses a drop of ink.

In many applications, the drive electronics supply a common drive signal to many nozzles, and a separate or integrated controller provides data switching to the printhead that determines which of the individual nozzles are to jet ink for a given instance of the actuation event. Data for a group of nozzles associated with a shared actuation event is called "stripe data".

By arranging a coordinated sequence of drive signals and switching inputs, the printhead produces an image on a substrate in the form of a pixel array as the printhead and substrate (an object surface) move relative to one another. This is applicable to, but not restricted to, single-pass printing systems, and scanning (multiple pass) printing systems. Data for such a coordinated sequence of actuation events being one or more instances of "stripe data" is called "swathe data". An area addressed by each printhead during printing is typically known as a "swathe".

Existing "stitching" techniques use precise drop placement to achieve apparent continuity between different swathes of a printed image. On flat surfaces it is often sufficient to print neighboring swathes with a single boundary line (known as a flat or butt stitch) and in this situation the only requirement is that the swathes are accurately registered. Also on flat surfaces, where some variation between the drop sizes of different heads is observed, it is common to interleave a few rows of drops from two neighboring swathes, so that the transition between potentially different color densities is gradual.

On curved surfaces there is the additional problem that the inkjet drops are in general no longer jetted perpendicular to the surface. This means that the pitch at the surface between drops from adjacent nozzles will no longer be the same as the nozzle pitch, but will vary with the angle at which those drops are incident upon the surface. In consequence, there will in general be a difference in color density at flat stitch boundaries between adjacent swathes due to a difference in dot pitch resulting from the adjacent swathes being printed by inkjet drops that are incident upon the surface at differing angles. The result is that for both flat stitch and interleaved stitching it is likely that at the boundary between adjacent swathes the dot pitch will be different, resulting in a step change in the density.

DE102018003096A1 recognizes the issue that image pixels on a 3D surface have "have different distances and orientations in relation to a 3D surface" and attempts to solve the problem by adjusting droplet sizes. EP1990206 A2 discussed a change in density of a single print path of a printhead that is linearly translated over a surface that falls away by nature of it having a radius or curvature. CN103722886A discloses methods of spraying on a surface rather than drop on demand printing methods.

It is to the above-mentioned problems, amongst others, that aspects according to the invention attempt to offer a solution. In particular, aspects of the invention provide methods and systems to manage the above-mentioned differences and so to achieve a stitch which has similar characteristics to those as of printing on a flat surface where the inkjet drops are incident upon the surface perpendicularly.

SUMMARY

According to a first independent aspect of the invention, there is provided a method comprising the steps of:

providing at least one printhead for printing an image on a curved surface from two different adjacent printhead positions with respect to a print path direction relative to the curved surface, the two different adjacent printhead positions at first and second orientations relative to the print path direction, wherein the at least one printhead and the curved surface move relative to each other along the print path;

determining an overlap area on the curved surface for two overlapping swathes of the print path, wherein the overlap area is to be printed on from either of the two different printhead positions; determining for a plurality of locations in the overlap area at which an inkjet drop may be printed the angle of incidence at the curved surface of that drop; and selecting a stitch point or region in the overlap area wherein the difference between the angles of incidence at the curved surface of drops from the two printhead positions, respectively, is kept within a predetermined parameter range, such that the difference between the respective dot pitches in the stitch region of the two different adjacent printhead positions is kept within an acceptable limit.

The method is advantageous for printing on curved surfaces on various shapes. Advantageously, the method enables arranging the geometry of the print so that the difference between the dot pitches is kept within an acceptable limit (e.g. within a predetermined parameter range), which is dependent on the quality requirements for the print. By keeping the difference between the first and second angles of incidence small, the stitch point or region may be selected such that the projected dot pitches corresponding to the two printhead positions are closely matched. In other words, the difference between the projected pitches at the two printhead positions is kept small and so the dot pitch in the stitch region of the two adjacent printhead positions matches within an acceptable limit. This is a key feature of the present invention which is distinguished over prior art, since none of the known methods use a selection a stitch point between two print path regions, such that the stitch point from each region is one that the angle of incidence, and therefore the difference in dot pitch, is kept within an acceptable limit.

In a dependent aspect, the two different adjacent printhead positions correspond to the same printhead. That is, the same print head has multiple passes along the print path.

Alternatively, the two different adjacent printhead positions correspond to two separate printheads.

The two printheads may have the same nozzle pitch. Preferably, the two printheads have the same orientation relative to the print path direction. In an example, the two printheads are both orthogonal to the print process direction (the direction of relative movement).

Alternatively, the two separate printheads have different "native" nozzle pitches resulting in differing printed dot pitches.

In a dependent aspect, the method further comprises stitching the two swathes at the selected stitch point.

In a second independent aspect, there is provided a control system for at least one printhead for printing an image on a curved surface from two different adjacent printhead positions with respect to a print path direction relative to the curved surface, the two different adjacent printhead positions at first and second orientations relative to the print path direction, wherein the at least one printhead and the curved surface are arranged to move relative to each other along the print path; the control system comprising a processor configured to:

determine an overlap area on the curved surface for the two overlapping swathes of the print path, wherein the overlap area is to be printed on from either of the two different printhead positions; determine for a plurality of locations in the overlap area at which an inkjet drop may be printed the angle of incidence at the curved surface of that drop; and select a stich point in the overlap area wherein the difference between the angles of incidence at the curved surface of drops from the two printhead positions, respectively, is kept below a predetermined parameter, such that the difference between the respective dot pitches in the stitch region of the two different adjacent printhead positions is kept within an acceptable limit.

BRIEF DESCRIPTION OF THE DRAWINGS

Aspects of the present invention will now be described, by way of example only, with reference to the accompanying figures, in which.

DETAILED DESCRIPTION

An example printing system comprising at least one printhead is provided to coat or decorate a "shape", representing an object to be printed on and including a curved surface. The object may have a nominal shape (nominal object surface) subject to tolerances in the order of a few hundred microns.

A "print path" describes the movement of a printhead (including an arrangement of nozzles) relative to a surface for printing. Accordingly, a print path is the relative movement of a nozzle arrangement and the object (shape) during the printing process. The "print path direction" is in the direction of print (direction of the printing process). A "path" describes the plurality of locations on the surface which are to pass under a nozzle. Determining the path of an individual nozzle provides the locus the nozzle traces across the target surface. This relative motion is equivalent even if the arrangement of nozzles is static and the object moves, or both move providing a relative motion.

Printing onto the object requires generating printhead nozzle data or print image generation. Typically, the printing of the image is wider than the width of one printhead, therefore multiple swathes, one from each printhead, are required to cover the target surface area. The print path has potentially overlapping neighboring swathes.

Good stitching of each neighboring swathe is critical because the human eye is very good at detecting discontinuities in a printed image, especially in areas of homogeneous color. The stitched area of two print paths (the overlap area of the potential adjacent swathes) is typically 20-40 pixels (e.g. 2-4 mm) but it will be appreciated that this can be smaller or much larger.

The nozzles of inkjet print heads are typically arranged so that they are evenly spaced across the head, and will therefore print ink droplets on to a flat surface at a constant pitch. For some head designs, this is achieved by placing the nozzles in a line at regular intervals, and these are known as linear heads. On other head designs, known as 2-D heads, the nozzles are placed in a two-dimensional array so that they are still evenly spaced along the print head but also displaced in the print direction. These nozzle arrangements are well known, and it will be obvious to those skilled in the art that the present invention applies equally to heads of both designs.

It is also well known that, especially for linear head designs, heads can be used to print in an orientation other than orthogonal to the print direction. This technique is known as 'raking' and can be used to modify the effective nozzle pitch of the head. This technique is well known, and it will be obvious to those skilled in the art that the present invention applies equally to print systems using heads which are oriented orthogonally or which are raked or both.

Figure 1:
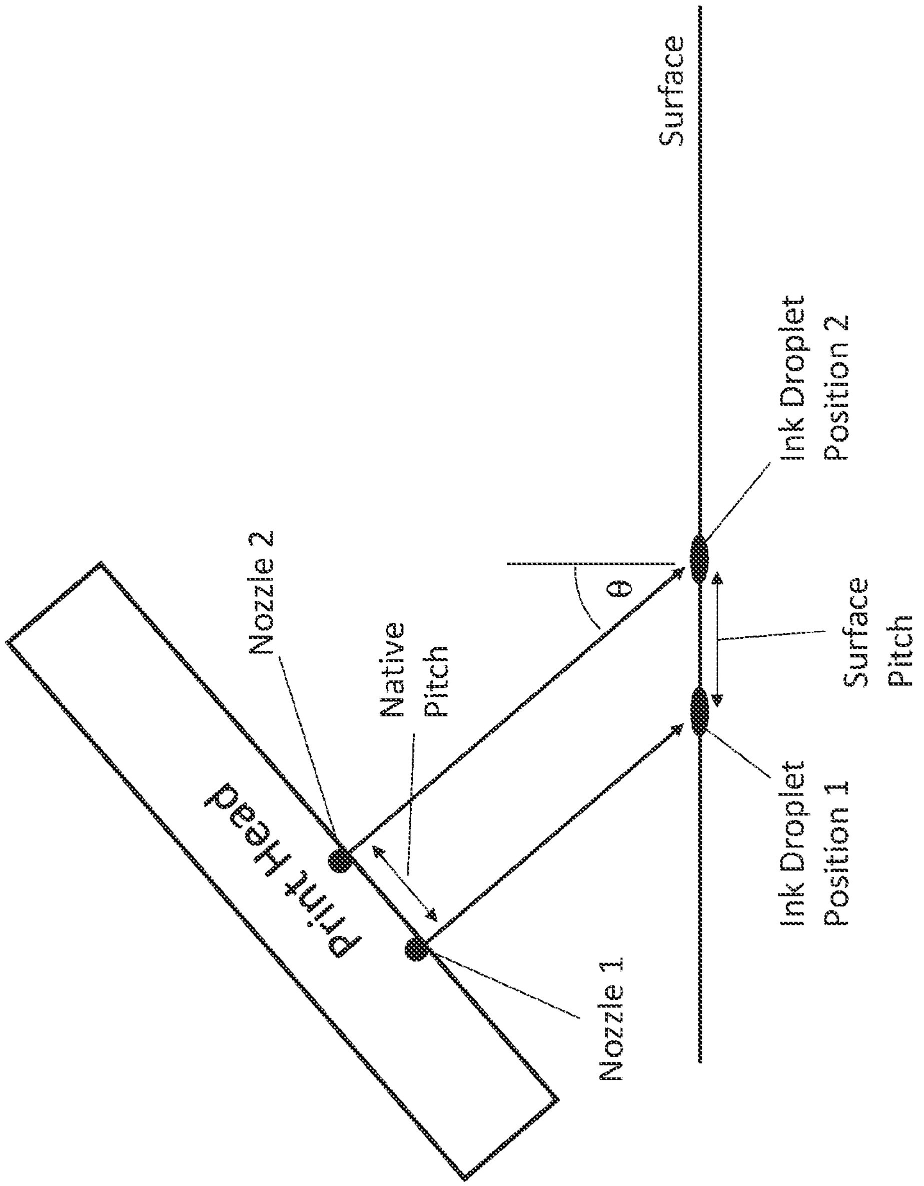
FIG. 1 is a schematic illustration of how the angle of incidence of ink droplets at a surface affects the pitch of the printed dots.

In FIG. 1, Nozzle 1 and Nozzle 2 are adjacent nozzles of the Print Head, separated by a distance known as the Native Pitch of the head. The nozzles eject ink droplets along substantially parallel trajectories which are incident at the surface at angle q. The Surface Pitch is the distance between the points where the ink droplets land. The relationship between the Native Pitch (NP) and the Surface Pitch (SP) is: SP=NP/cosine(q).

Figure 2:
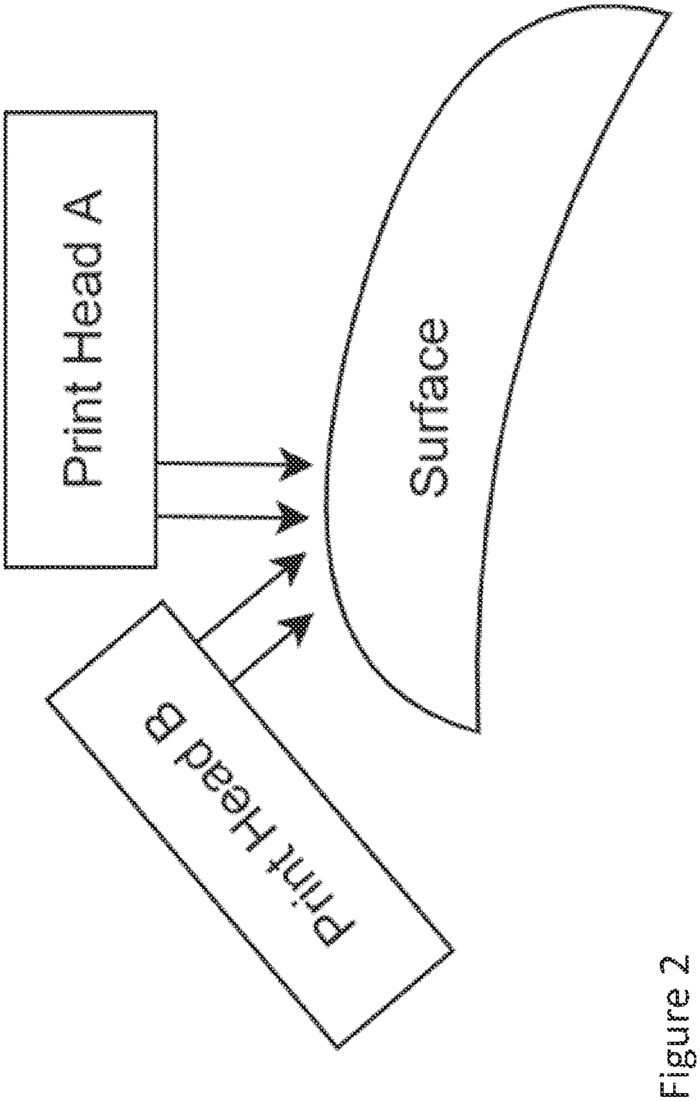
FIG. 2 is a schematic illustration of a printing system for printing onto a surface such that the stitch region is achieved by inkjet drops that have differing angles of incidence at the surface from position A and position B.

Unlike stitching onto flat surfaces where swathes are printed by inkjet drops that have the same angle of incidence at the surface, stitching on to arbitrary curved surfaces typically results in swathes printed by inkjet drops that have differing angles of incidence at the surface. With reference to FIG. 2, consider the case of two positions for a printhead, and a curved surface (i.e. shape or object) on to which a printhead prints from each position. Note that we distinguish only the positions, and the print might either be by the same printhead moving between the two positions, or by two printheads printing in parallel. In other words, when we refer to "two printheads" A, B this covers the case whereby the same print head has moved to a different area.

In the example of FIG. 2, it can be seen that the two print positions are such that in the stitch region, Print Head A is printing almost perpendicular to the surface, but Print Head B is printing at an incident angle θ of approximately 45 degrees. Assuming that the print heads have the same nozzle pitch, the drops from Print Head B will have a dot pitch at the surface which is greater than the nozzle pitch by the factor 1/cos(θ), which in this case would be 1/)cos(45° ~=1.41.

Such a difference between the angles of incidence at the surface of drops from the two printhead positions will give rise to a significant difference between the corresponding dot pitches at the surface. Such a difference between the dot pitches would cause a density shift at the stitch point of a flat stitch, and would make it impossible to employ an interleaved stitch. It is therefore advantageous to arrange the geometry of the print so that the difference between the dot pitches is kept within an acceptable limit, which is dependent on the quality requirements for the print. For flat stitches, the maximum dot pitch difference is determined by the maximum acceptable density shift. For an interleaved stitch, the maximum acceptable dot pitch difference also depends on the width of the stitch zone. Typically for interleaving to be effective, dot positions should not vary from nominal by more than about 10% of dot pitch, so in this case for a stitch zone 10 nozzles wide the acceptable limit for the difference in surface dot pitches would be 1%.

Figure 3:
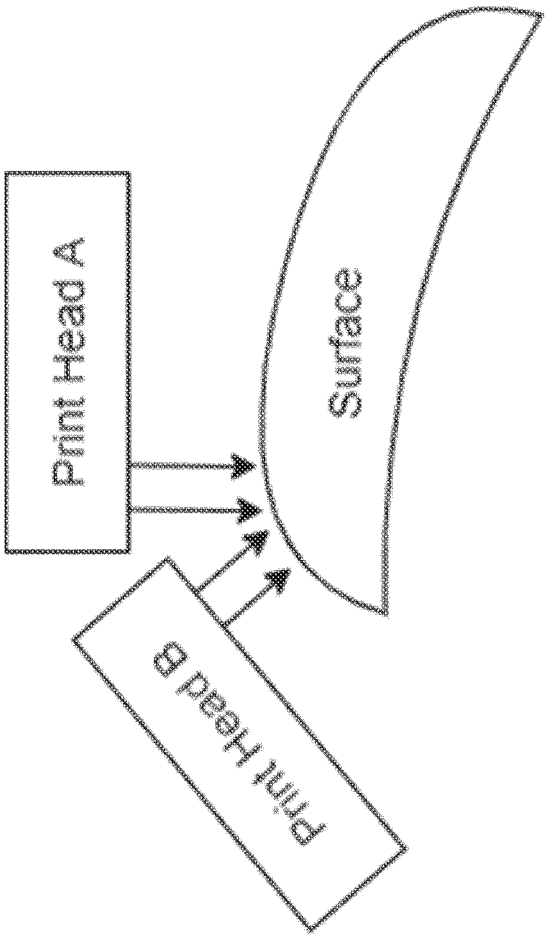
FIG. 3 is a schematic illustration of a printing system for printing onto a surface such that a stitch region is achieved by inkjet drops that have a similar angle of incidence at the surface from position A and position B.

With reference to FIG. 3, the relative positions of the print heads and the surface are as shown. In this case, the stitch region has been chosen so that the angles $\theta_A$, $\theta_B$ of incidence at the surface of drops from each print head position are equal, or approximately so. Advantageously, the absolute difference between $\theta_A$ and $\theta_B$ is kept small so the surface dot pitch in the stitch region for the two positions will match, making it easier to match densities in the two swathes, and to use an interleaved stitch if required.

Figure 4:
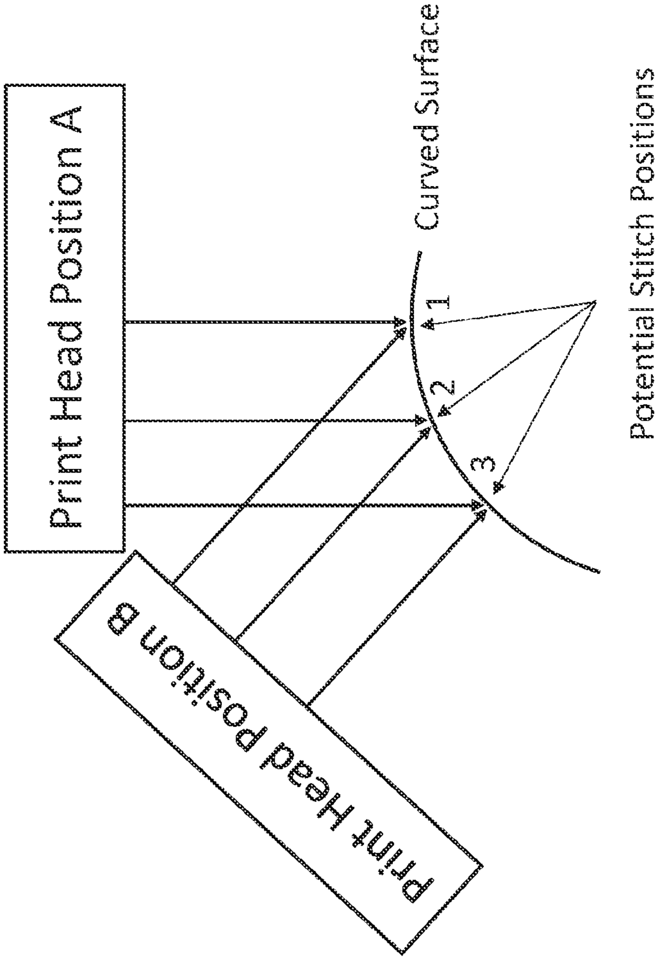
FIG. 4 shows two Print Head positions, A and B, which are arranged so that a proportion of the nozzles of a Print Head at each position might print ink droplets on the same region of the Curved Surface.

FIG. 4 shows two Print Head positions, A and B, which are arranged so that a proportion of the nozzles of each might print ink droplets on the same region of the Curved Surface. It is apparent that at the extremes of this region of overlap, Potential Stitch Positions 1 and 3, the angle of incidence at the surface of drops from Position A will differ markedly from that of drops from Position B. Furthermore, for a continuously curving surface, that there will be a point or region between those extremes, Potential Stitch Position 3 at which such differences between the angles of incidence will be small.

The method of selection for the stitch region will now be described with reference to FIG. 4. Two printhead positions A and B are such that there is an overlap of the projected inkjet drops from printhead position A and printhead position B, as projected onto the surface of the object. As such there are is a plurality of nozzle positions $N_A$ that can be selected from printhead positioned at A and a plurality of nozzle positions $N_B$ that can be positioned at B, such that the inkjet drop contribution from printhead position A and that from printhead position B result in printhead position A creating a projected inkjet drop that is the closest neighbor to that resulting from printhead position B, in other words creating projected inkjet drops that neighbor each other in the stitch region. The selection of the most optimal nozzles $N_A$ $N_B$ from printhead positions A and that from position B respectively is such that their projected drops are both neighboring and the absolute difference of the angles of incidence $|\theta_A-\theta_B|$ of the inkjet drop from printhead position A and that from printhead position B is kept small.

Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method comprising:

providing at least one drop-on-demand printhead for printing an image on a curved surface from two different adjacent printhead positions with respect to a print path direction relative to the curved surface, the two different adjacent printhead positions at first and second orientations relative to the print path direction, wherein the at least one drop-on-demand printhead and the curved surface move relative to each other along the print path;

determining an overlap area on the curved surface for two overlapping swathes of the print path, wherein the two overlapping swathes are parallel to a center axis of the curved surface, wherein the overlap area is to be printed on from either of the two different printhead positions;

determining for a plurality of locations in the overlap area at which an inkjet drop may be printed an angle of incidence at the curved surface of the drop; and selecting a stitch point or region in the overlap area wherein a difference between the angles of incidence at the curved surface of drops from the two different adjacent printhead positions, respectively, is kept within a predetermined parameter range, such that a difference between respective dot pitches in the stitch region of the two different adjacent printhead positions is kept within an acceptable limit;

wherein the two different adjacent printhead positions correspond to a same printhead of the at least one drop-on demand printhead, the overlapping swathes corresponding to different passes of the same printhead in the print path direction, or wherein the at least one drop-on-demand printhead comprises two printheads and the two different adjacent printhead positions correspond, respectively, to the two printheads.

2. The method according to claim 1, wherein the two printheads have equal nozzle pitches.

3. The method according to claim 1, wherein the two printheads have a same orientation relative to the print path direction.

4. The method according to claim 3, wherein the two print heads have different nozzle pitches.

5. The method according to claim 1, comprising stitching the two swathes at the selected stitch point.

6. A control system for at least one drop-on-demand printhead for printing an image on a curved surface from two different adjacent printhead positions with respect to a print path direction relative to the curved surface, the two different adjacent printhead positions at first and second orientations relative to the print path direction, wherein the at least one drop-on-demand printhead and the curved surface are arranged to move relative to each other along the print path;

the control system comprising a processor configured to:

determine an overlap area on the curved surface for the two overlapping swathes of the print path, wherein the two overlapping swathes are parallel to a center axis of the curved surface, wherein the overlap area is to be printed on from either of the two different printhead positions;

determine for a plurality of locations in the overlap area at which an inkjet drop may be printed an angle of incidence at the curved surface of the drop; and select a stich point in the overlap area wherein a difference between the angles of incidence at the curved surface of drops from the two different adjacent printhead positions, respectively, is kept within a predetermined parameter range, such that a difference between respective dot pitches in the stitch region of the two different adjacent printhead positions is kept within an acceptable limit;

wherein the two different adjacent printhead positions correspond to a same printhead of the at least one drop-on-demand printhead, the overlapping swathes corresponding to different passes of the same printhead in the print path direction, or wherein the at least one drop-on-demand printhead comprises two printheads and the two different adjacent printhead positions correspond, respectively, to the two printheads.

* * * * *